No. 632,873. Patented Sept. 12, 1899.
HENRI DE RUFZ DE LAVISON.
VOLTAIC BATTERY CELL.
(Application filed Aug. 12, 1898.)
(No Model.) 2 Sheets—Sheet 1.
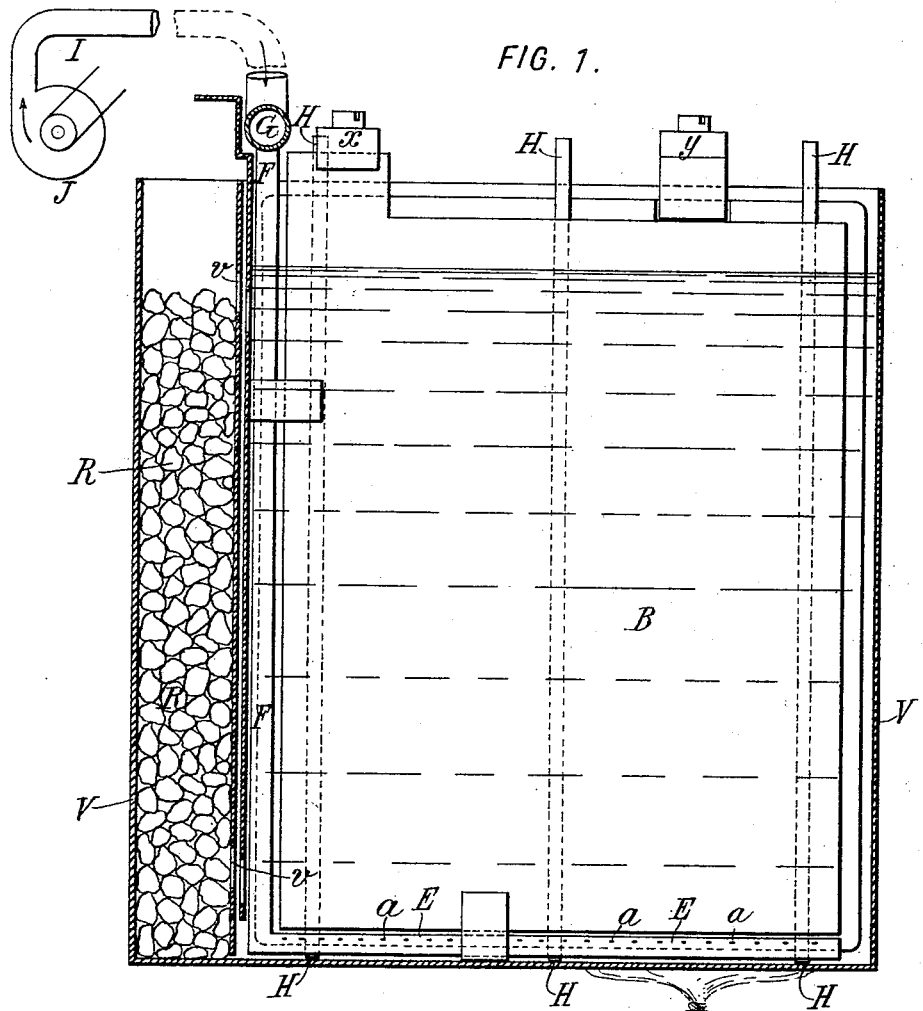
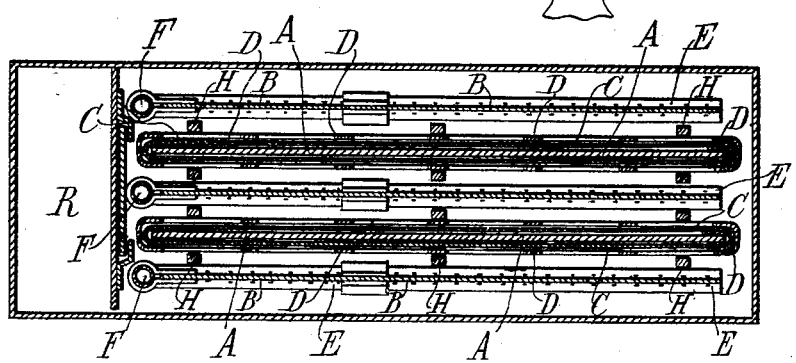

No. 632,873. Patented Sept. 12, 1899.
HENRI DE RUFZ DE LAVISON.
VOLTAIC BATTERY CELL.
(Application filed Aug. 12, 1898.)
(No Model.) 2 Sheets—Sheet 2.
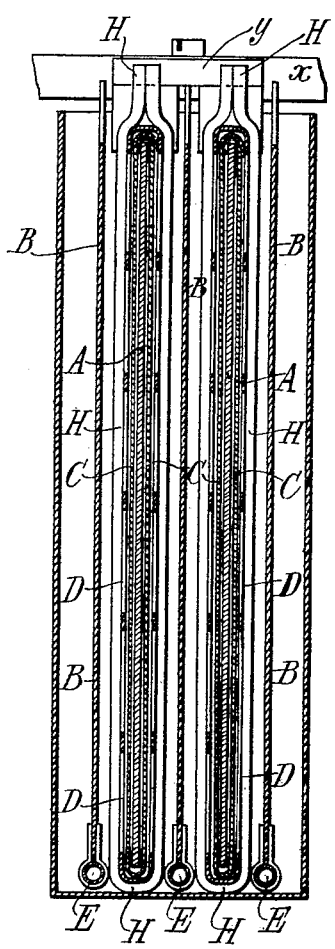
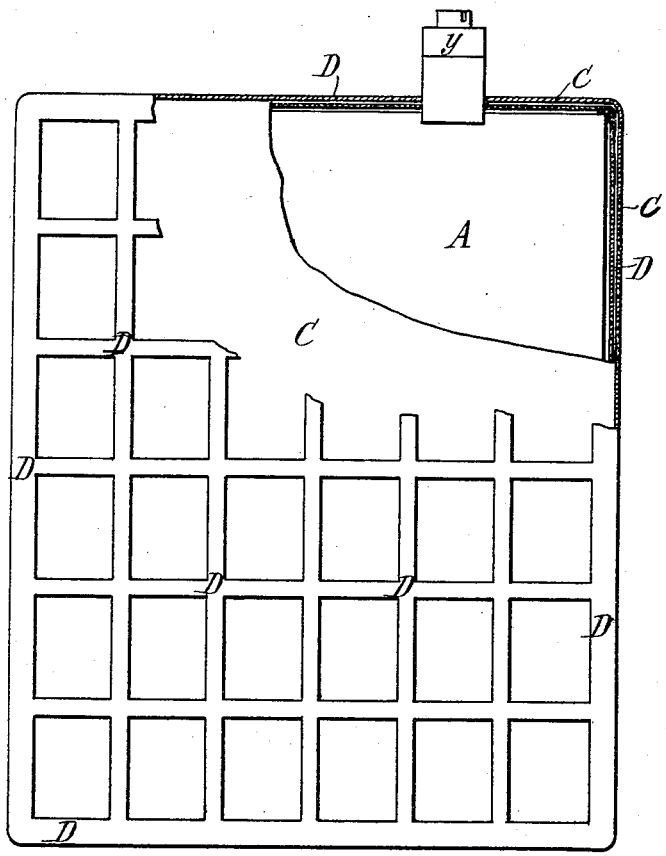
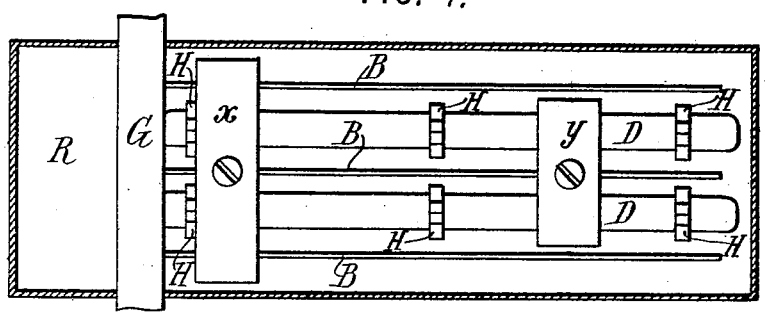
WITNESSES: INVENTOR:
Fred White Henri de Rufz de Lavison,
René Brunel By his Attorneys

UNITED STATES PATENT OFFICE.

HENRI DE RUFZ DE LAVISON, OF NEUILLY, FRANCE.

VOLTAIC BATTERY-CELL.

SPECIFICATION forming part of Letters Patent No. 632,873, dated September 12, 1899.

Application filed August 12, 1898. Serial No. 688,409. (No model.)

*To all whom it may concern:*

Be it known that I, HENRI DE RUFZ DE LAVISON, engineer, a citizen of the Republic of France, residing in Neuilly-sur-Seine, (Seine,) France, have invented a new and useful Improvement in Voltaic Battery-Cells, which invention is fully set forth in the following specification.

This invention relates to a voltaic battery-cell in which depolarization is effected by a current of hot air blown in at the base of the positive electrodes and ascending along their surfaces.

Figure 1 of the accompanying drawings is a vertical section of a cell constructed according to my invention. Fig. 2 is a horizontal section. Fig. 3 is a transverse section. Fig. 4 is a plan. Fig. 5 shows the arrangement of each negative electrode inclosed in a porous case supported by an insulating-frame.

The cell consists of zinc plates A, arranged between copper plates B. Each of the zinc plates A is inclosed in a porous casing C—such, for instance, as parchment-paper—within a frame D of insulating material—such, for instance, as celluloid—which is kept about five millimeters away from the copper plates by bands H of caoutchouc or other insulating material. Under each of the copper plates B is fixed a tube E of any material perforated with five holes $a$ very near each other. The holes $a$ may have a diameter of one-tenth or two-tenths of a millimeter and may be about one or two millimeters apart. Each of these tubes E is connected at one end with an upright tube F, communicating with a general supply-tube G at the top of the battery. Air may be forced into the tube G by any suitable means—as, for example, by a blower—this being indicated on a reduced scale in Fig. 1, where J is a rotary fan or blower and I is the pipe carrying the compressed air therefrom to the tube G. When the cell is heated above 30° centigrade and preferably to about 60° centigrade, air is blown in by the perforated tubes E, this air immediately acquiring the temperature of the surrounding liquid, and whether it oxidizes the plates or whether it, so to speak, intercepts the hydrogen in its passage it powerfully contributes to depolarization or in a weak cell it effects it entirely. The cell may be heated by any suitable means—as, for example, by applying a spirit-lamp beneath it, as indicated in dotted lines at K in Fig. 1.

In a powerful cell there should be a quantity of copper sulfate to maintain the strength of the liquid electrolyte to two or three per cent. of sulfate. The copper sulfate is contained in a reservoir R, at one side communicating with the battery by adjustable holes $v$ at the top and bottom. The liquid employed contains from 2.5 to five per cent., by volume, of sulfuric acid.

A cell having ten zinc plates each about fifteen centimeters broad and nineteen centimeters high and containing nine liters of liquid gives fifty amperes at one volt against an exterior resistance of .02 ohm, or one hundred amperes at .9 volt against .009 ohm, or two hundred amperes at .6 volt against .003 ohm, this last condition being maintained for four hours with the same liquid. The quantity of copper sulfate consumed is about one-third of that which would be expended in an ordinary Daniell cell. There is no sensible deposit of copper on the zinc by reason of the weakness of the solution of copper sulfate.

The depolarizing action of the air is believed to take effect in the following manner: The water of the electrolyte is decomposed, as ordinarily, into its two elements. The oxygen passes to the zinc and the hydrogen to the copper. Heat aids in producing these reactions, and the cell becomes very active. The air blown in acts by its oxygen in two different ways: First, it encounters the liberated hydrogen, and a part of this hydrogen combines with a part of the oxygen of the air; second, the uncombined hydrogen encounters the copper sulfate and combines with the oxygen thereof, freeing its sulfuric acid and precipitating copper into the electrolyte. The uncombined oxygen of the air then combines with this precipitated copper and the oxid regenerates the solution of copper sulfate.

Any number of cells may be connected in parallel or in series, the current being conducted by bars at the top for the zinc and the copper.

The porous materials and dimensions of the different parts of the cell may be varied, as well as the connection of the elements, according to their intended purpose.

I claim as my invention the following-defined novel features, substantially as hereinbefore specified, namely:

1. A voltaic cell having an air-conduit extending beneath the negative plate and formed with perforations beneath opposite sides of said plate, whereby air forced through said conduit will escape in bubbles and ascend through the electrolyte along both faces of said plate.

2. A voltaic cell comprising a positive plate, a porous casing inclosing said plate, a frame of insulating material surrounding said plate and casing, non-conducting bands around said frame, and negative plates arranged on opposite sides of said positive plate, with an air-conduit terminating in perforations beneath said plates, whereby air forced through said conduit will escape in bubbles and ascend through the electrolyte between the positive and negative plates.

In testimony whereof I have signed this specification in the presence of two subscribing witnesses.

HENRI DE RUFZ DE LAVISON.

Witnesses:
EDWARD P. MACLEAN,
MARCEL ARMENGAUD.